July 25, 1961     E. F. ENGSTROM     2,993,273
CITRUS FRUIT PEELING DEVICE
Filed Feb. 2, 1960
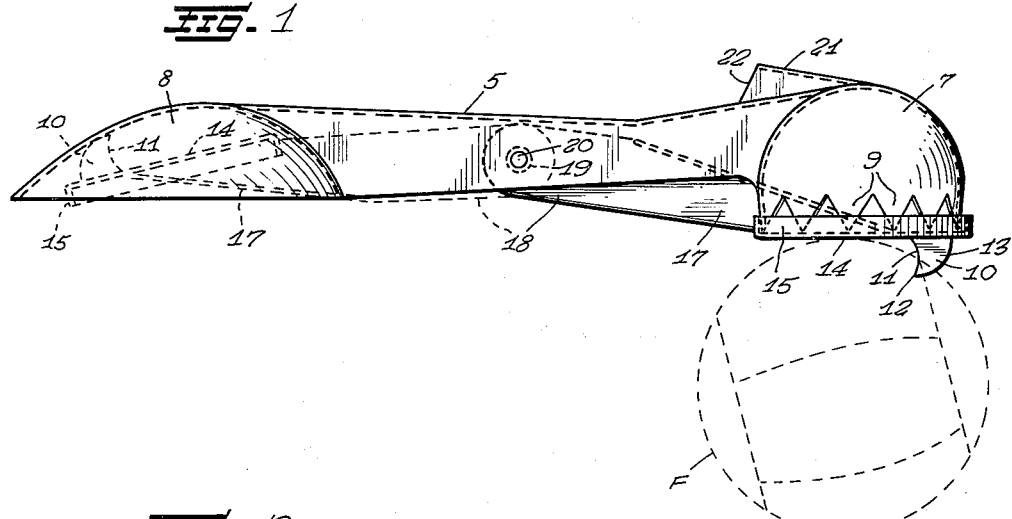
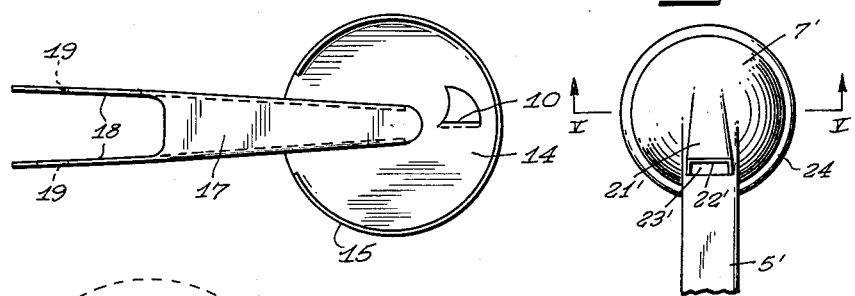
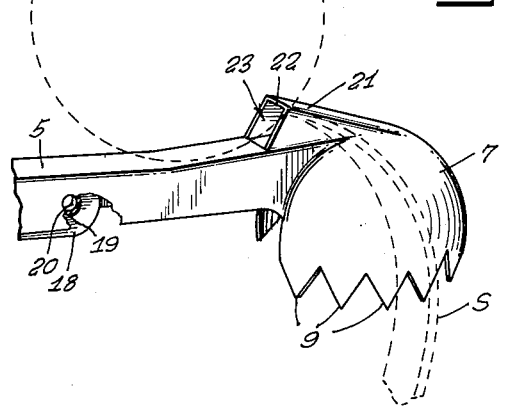
Inventor
Ernst F. Engstrom

United States Patent Office 2,993,273
Patented July 25, 1961

2,993,273
CITRUS FRUIT PEELING DEVICE
Ernst F. Engstrom, 414 Walnut St., Apt. 303,
Maywood, Ill.
Filed Feb. 2, 1960, Ser. No. 6,201
7 Claims. (Cl. 30—24)

The present invention relates to devices for assisting in the manual removal of the rind or peel of thick skinned fruit such as citrus fruits, including oranges and grapefruits, and is more particularly an improvement upon the device disclosed in my Patent 2,858,605 issued November 4, 1958.

In my aforesaid patent a citrus fruit peeling device is disclosed which in most respects is the same as the device disclosed herein. However, in the patented device the swingably mounted cutting or scoring arm which is pivotally connected to the intermediate handle portion between a toothed fruit pole scoring knob and a spoon-shaped peel stripper is arranged to be backed against the stripper spoon for use in segmentally scoring the fruit peel preparatory to stripping the peel in segments from the fruit. During the segmental or longitudinal scoring with my prior device, the circular series of pole end scoring teeth on the knob of the device are exposed and unless the user exercises some degree of expert care the teeth are engaged or clamped onto by the fingers. As a result, there has been some resistance to use of the prior device. But by the present invention this difficulty has been overcome, as well as certain other improvements made in the device.

It is accordingly an important object of the present invention to provide a citrus fruit peeling device in which a novel slitting or scoring means has been provided serving the dual functions of a scorer and a protective cap for the circular series of pole scoring teeth on a scoring knob of the device.

Another object of the invention is to provide an improved citrus fruit peeling device providing a novel scoring member providing a firm abutment for the periphery of the fruit being scored.

A further object of the invention is to provide a citrus fruit peeling device equipped with a novel scoring member with an especially effective scoring tooth structure.

Yet another object of the invention is to provide a novel citrus fruit peeling device including means for cutting and stripping citrus fruit peel into narrow strips for making candied or dried peel.

Other objects, features and advantages of the present invention will be readily apparent from the following detailed description of a preferred embodiment thereof taken in conjunction with the accompanying drawing, in which:

FIGURE 1 is a side elevational view of a citrus fruit peeling device embodying features of the invention;

FIGURE 2 is a top plan view of the pivotal scoring arm and protective cap member of the device;

FIGURE 3 is a fragmentary perspective view of the knob end portion of the device illustrating the strip peeler feature of the device;

FIGURE 4 is a fragmentary top plan view of a slightly modified form of the device; and FIGURE 5 is a sectional detail view taken substantially on the line V—V of FIGURE 4.

In general, the fruit peeling device of the instant application is similar to that disclosed in my Patent 2,858,605 to which reference may be had for some details that may be more fully illustrated and described therein. As best seen in FIGURE 1 the device has an elongated body frame portion 5 of channel shape serving conveniently as a handle and having integrally at one end thereof a dome-shaped hollow knob portion 7 of generally semi-spherical head shape, and at the opposite end a generally spoon-shaped peel stripper 8. It will be appreciated that the device as thus far described may be stamped from suitable gauge sheet metal such as stainless steel in one piece with the channel of the intermediate handle portion 5 opening into the knob 7 and the spoon 8 at the respectively opposite ends of the handle portion and with the channel of the handle portion opening outwardly in the same direction as the hollow knob 7 and the spoon 8 open.

On its open end perimeter, the knob-head 7 is provided with a circular series of generally saw-tooth cutting teeth 9 projecting generally axially in the opposite direction from the dome-shape of the knob-head and of a depth which will enable the teeth to penetrate even the thickest citrus fruit skin when pressed into the pole end portions of a citrus fruit F. As indicated in dot-dash outline in FIGURE 1, a circular scoring of the pole end portions of the fruit F will result when the teeth are pressed into the skin of the fruit and the device turned about the axis of the knob 7 concentric with the row of teeth 9 to make circular cuts in the pole end portions of the fruit.

Then, longitudinal scorings as shown in dash outline are adapted to be made between the circular pole end scorings by means of a slitter tooth 10 which for cutting efficiency is of generally hook-shape having an inner concave cutting edge 11 terminating in a generally inwardly directed point 12 at juncture with an outer convex edge 13. This hook shape of the cutting edge 11 enables it to enter the fruit peel easier and tends to keep the edge from withdrawing from the peel during the scoring operation. At the same time, the convex rounded outer edge 13 is adapted to serve as a depth gauge smoothly against the protective membrane or skin enveloping the juice cells of the fruit immediately under the peel, without rupturing such skin. By having the material of the slitter tooth 10 of sufficiently thin gauge, no sharpening of the edge 11 is needed for cutting the rather soft citrus fruit peels, and on the other hand the fairly blunt nature of the outer edge 13 avoids cutting into the reasonably tough protective membrane skin encasing the juice cells.

In a desirable, practical form, the slitter tooth 10 is carried rigidly by a circular cap plate 14 of a diameter to bear against the tips of the circular row of slitter teeth 9 of the dome 7, a peripheral curb flange 15 being provided on the seating face of the cap plate 14 to encircle the teeth 9 protectively. This flange 15 also serves to enable convenient manual gripping of the cap plate during slitting of a fruit peel and by coaction with the encircled teeth 9 functions to retain the cap plate 14 against transverse displacement relative to the teeth. Conveniently, the slitter tooth 10 is in the present instance struck out from and bent to right angles relative to the face of the cap plate 14 opposite to the circular slitter teeth engaging face of the cap plate and located adjacent to the periphery of the cap plate so as to be disposed in operation near the side of the dome 7 which is furthest from the handle 5. Through this arrangement, the portion of the cap plate 14 inwardly from the slitter tooth 10 serves conveniently as a back-up or base to rest against the perimeter of the citrus fruit F being scored, as shown in FIGURE 1.

Support for the cap plate 14 is afforded by an arm 17 which may be formed separately from the cap plate and secured thereto by welding or brazing or the like or may be formed up integrally therewith from a single piece of sheet material, or if molded from plastic molded in one piece. This arm 17 projects upwardly and beyond the perimeter of the cap plate from the opposite side thereof relative to the scoring tooth 10 and is constructed and arranged to be pivotally attached within the channel of the intermediate handle portion 5 of the device. For this purpose, the arm 17 may be of inverted U-shape cross-section having on its rear end portion spaced apart rearwardly extending side wall journal flange extensions 18 which are parallel and stiffly resiliently flexible to be flexed toward one another to facilitate assembly of aligned journal openings 19 therein with respective inwardly pressed bearing protrusions 20 formed coaxially in the side walls defining the handle portion 5. Through this arrangement, the arm 17 is pivotally mounted within the handle portion 5 for swinging of the arm 17 and the cover plate 14 between the scoring position shown in full line in FIGURE 1 and an out of the way position as shown in dash outline wherein the cover plate 14 is housed within the cavity of the spoon portion 8 of the device.

In use of the device, the first operation will be performed with the cap plate 14 in its out of the way position within the spoon 8 as shown in dash outline in FIGURE 1 so that the rotary slitter teeth 9 of the knob head 7 are exposed for making circular pole end circular slits in the opposite ends of the fruit F to be peeled. Thereafter, the arm 17 is swung into the full line position shown in FIGURE 1 to place the cap plate 14 in its seated, protective relation against the tips of the teeth 9 and with the slitter tooth 10 exposed in its peel slitting orientation. Longitudinal segmental slitting of the fruit peel may then proceed. During such slitting a raised projection 21 on top of the dome-attached end portion of the handle 5 provides a thumb rest affording leverage advantage for manipulating the device with respect to the fruit F to be peeled.

After slitting of the fruit peel has been accomplished, the device is turned around in the hand so that the peeling spoon 8 projects forwardly, and with the cap 14 remaining in seated relation against the circular slitting teeth 9 as a protector for the fingers and palm of the hand in which the device is grasped. Since the slitter tooth 10 is located toward the far end portion of the knob terminus, it will not interfer with grasping of the device during the peeling operation, and more particularly where the knob 7 is used as a thrust abutment against which the cupped palm of the hand is pressed to afford thrust force toward the peeling spoon 8. It will be observed that the projection 21 by presenting an upper slanted surface that merges with the crown of the dome 7 provides a generally palm-conformable thrust surface extension for the dome, actually aiding in the peeling thrust toward the peeling spoon 8 by the palm of the manipulating hand.

In addition to its function as a thumb rest and thrust surface, the projection 21 is constructed and arranged to serve as a peel strip cutter as shown in FIGURE 3 where it is desired to cut strips from the fruit peel for making candied peel or for drying to be used as seasoning or flavoring. To this end, the upwardly and outwardly slanted inner end surface of the projection 21 is formed by an edge 22 as a result of pressing the projection 21 from the material of the top of the handle 5 where the device is made from sheet metal. Thereby the edge 22 frames an opening 23 into the interior of the hollow shell dome 7. By having the edge 22 of generally U-shape as shown, it provides a convenient cutting edge which is adapted to groove out of the peel of the fruit a strip S, the top of the handle 5 inwardly from the edge 22 serving as a depth gauge while the device is advanced over the periphery of the fruit F or the fruit is rotated with the edge 22 in gouging, stripping engagement with the fruit peel. As the strip S is cut and stripped it is deflected by the sloping upper surface of the projection 21 downwardly from within the hollow projection into and downwardly through the hollow knob 7, assuming the device is in the position of FIGURE 3, or upwardly into the cup of the hollow dome 7 if the device is held with the teeth 9 projecting upwardly to be operative on top of the fruit being peeled.

Referring to FIGURES 4 and 5, a slightly modified form is shown wherein primed reference numerals identify corresponding parts to those in the device as shown in FIGURES 1 and 3. In this modified form, the hollow dome 7' has at juncture of the pole-scoring teeth 9' a shoulder flange 24 which at the inner sides of the teeth faces in the same direction as the projection of the teeth and serves as a depth gauge stop engageable with the outer surface of the fruit peel to avoid too deep penetration of the teeth 9' during circular scoring of the fruit. By thus restricting the depth to which the teeth may cut into the fruit, digging or cutting or tearing into the fruit meat can be avoided to at least a large extent during circular scoring, especially where the user has had at least a minimum of experience with the device and allows the shoulder 24 to serve its proper function and does not overexert pressure against the dome 7' in thrusting the teeth 9' into the fruit peel initially or during the relative rotary movement of the dome and the fruit incident to effecting circular scoring. It will be appreciated, of course, that the length of the teeth 9 from the shoulder 24 will be predetermined for average citrus fruit peel thickness or slightly shorter than such average. Since citrus fruits vary considerably in thickness of the peel depending upon variety, the user will have to use some judgment in respect to depth of penetration of the teeth 9'. In this regard, the shoulder 24 assists exercise of such judgment not only by affording a physical stop or depth gauge to which the user can respond by "feel" by virtue of resistance to tooth-penetration movement beyond where the shoulder engages the peel, but also as a general visual guide by observing the relationship of the outer side of the shoulder flange 24 to the surface of the peel during the rotary scoring manipulation.

Since all parts of the device are readily accessible and the shell construction affords ready access into all of the hollow areas and parts, the device can be readily maintained in a clean, sanitary condition by ordinary washing techniques.

It will be understood that modifications and variations may be effected without departing from the scope of the novel concepts of the present invention.

I claim as my invention:

1. In combination in a fruit peeling device of the character described, an elongated handle having at one end a hollow knob provided with a substantially circular edge, and a cap member movably attached to said handle and of a diameter to engage on one face thereof in seated relation against said edge.

2. In a fruit peeling device of the character described, a handle having on one end thereof a pole end scoring member having a circular series of scoring teeth, and a cap member engageable protectively with and about said teeth.

3. In a fruit peeling device of the character described, a generally channel-shaped handle portion having at one end thereof a hollow pole end scoring slitter dome with an edge providing a circular series of slitter teeth, an arm pivotally mounted in said handle and having on the distal end thereof a cap plate adapted to be swung from an out of the way position on said arm into protective engagement with said teeth.

4. In a fruit peeling device of the character described, a generally channel-shaped handle portion having at one end thereof a hollow pole end scoring slitter dome with an edge providing a circular series of slitter teeth, an arm pivotally mounted in said handle and having on the distal end thereof a cap plate adapted to be swung from an out of the way position on said arm into protective engagement with said teeth, said cap plate having a curb flange arranged to encircle said teeth.

5. In a fruit peeling device of the character described, an elongated handle having at one end a scoring knob with a series of circularly disposed scoring teeth directed away from one side of the handle, said handle and the knob having a projection thereon having a surface engageable by the thumb of a manipulating hand to facilitate manipulation of the handle and knob for scoring with said teeth.

6. In a fruit peeling device of the character described, an elongated handle having at one end a scoring knob with a series of circularly disposed scoring teeth directed away from one side of the handle, said handle and the knob having a projection thereon having a surface engageable by the thumb of a manipulating hand to facilitate manipulation of the handle and knob for scoring with said teeth and said projection having a slanted surface extending away from the knob engageable by the palm of a manipulating hand.

7. In a device of the character described including a handle and a hollow dome shaped portion at one end of the handle having an edge, a pivoted arm carried by said handle and having a cap plate portion provided with a face engageable in one position of the arm with said edge and in another position of the arm being swung clear of the edge to expose the same.

References Cited in the file of this patent

UNITED STATES PATENTS

| | | |
|---|---|---|
| 754,191 | Beil | Mar. 8, 1904 |
| 2,546,032 | Holmberg | Mar. 20, 1951 |
| 2,549,326 | Moore | Apr. 17, 1951 |
| 2,727,302 | Countryman | Dec. 20, 1955 |
| 2,743,519 | Hazelton | May 1, 1956 |
| 2,815,570 | Engstrom | Dec. 10, 1957 |
| 2,836,886 | Marulli | June 3, 1958 |
| 2,858,605 | Engstrom | Nov. 4, 1958 |
| 2,900,717 | Byrd et al. | Aug. 25, 1959 |